United States Patent
Gates

(10) Patent No.: US 9,629,213 B2
(45) Date of Patent: Apr. 18, 2017

(54) VARIABLY CONTROLLED LIGHTING MECHANISM FOR FEEDERS

(71) Applicant: All Seasons Feeders, Ltd., San Antonio, TX (US)

(72) Inventor: Zach Gates, San Antonio, TX (US)

(73) Assignee: All Seasons Feeders, Ltd., San Antonio, TX (US)

( * ) Notice: Subject to any disclaimer, the term of this patent is extended or adjusted under 35 U.S.C. 154(b) by 274 days.

(21) Appl. No.: 14/321,564

(22) Filed: Jul. 1, 2014

(65) Prior Publication Data

US 2015/0008822 A1 Jan. 8, 2015

Related U.S. Application Data

(60) Provisional application No. 61/842,282, filed on Jul. 2, 2013.

(51) Int. Cl.

| | | |
|---|---|---|
| *A01K 39/00* | (2006.01) | |
| *H05B 33/08* | (2006.01) | |
| *H05B 37/02* | (2006.01) | |
| *A01K 5/01* | (2006.01) | |
| *A01K 5/02* | (2006.01) | |
| *F21V 33/00* | (2006.01) | |
| *F21V 23/04* | (2006.01) | |
| *F21S 10/02* | (2006.01) | |
| *F21W 131/10* | (2006.01) | |
| *F21Y 101/00* | (2016.01) | |

(Continued)

(52) U.S. Cl.
CPC .......... *H05B 33/0845* (2013.01); *A01K 5/01* (2013.01); *A01K 5/02* (2013.01); *F21S 10/023* (2013.01); *F21V 23/0435* (2013.01); *F21V 33/00* (2013.01); *H05B 37/0272* (2013.01); *F21W 2131/10* (2013.01); *F21Y 2101/00* (2013.01); *F21Y 2113/13* (2016.08); *F21Y 2115/10* (2016.08)

(58) Field of Classification Search
CPC .... A01K 39/012; A01K 39/02; A01K 5/0241; A01K 39/00; A01K 5/00; H05B 37/029; H05B 37/0281; H05B 37/0272; H05B 33/0845; F21Y 2101/02; F21V 17/00; F21K 9/30; A01M 31/002; H05K 5/0204
USPC ....... 119/52.4, 53, 54, 72, 75; 315/292, 294, 315/297, 312, 360; 362/84, 183, 363
See application file for complete search history.

(56) References Cited

U.S. PATENT DOCUMENTS

| | | | | |
|---|---|---|---|---|
| 7,175,302 B2* | 2/2007 | Kazar | ................. | H05B 37/029 307/12 |
| 7,448,347 B2* | 11/2008 | Richmond | ........... | A01K 39/012 119/72 |
| D644,366 S * | 8/2011 | Barley | .......................... | D26/62 |

(Continued)

*Primary Examiner* — Haissa Philogene
(74) *Attorney, Agent, or Firm* — Kirby B. Drake; Klemchuk LLP

(57) ABSTRACT

A variably controlled lighting mechanism, sometimes referenced as a hog light, may be attached to the underside of a feeder and used in non-daylight hours to provide selective illumination through more than one color of LED light that may be inset within the hog light. A wireless remote may include a series of inputs that may control various aspects of the hog light, particularly to illuminate the different LED lights that are integrated within the hog light, as well as to control the motor and/or feeder. The hog light also may be manually operated to selectively illuminate the different LED lights.

16 Claims, 4 Drawing Sheets

(51) Int. Cl.
    *F21Y 115/10*     (2016.01)
    *F21Y 113/13*     (2016.01)

(56) References Cited

U.S. PATENT DOCUMENTS

| | | | |
|---|---|---|---|
| 8,787,621 B2* | 7/2014 | Spicola, Sr. | G01G 9/00 |
| | | | 382/100 |
| 9,380,776 B2* | 7/2016 | Hays | H05K 5/0204 |
| 2009/0020073 A1* | 1/2009 | Hansen | A01K 5/0291 |
| | | | 119/51.11 |
| 2016/0277688 A1* | 9/2016 | Gaskamp | H04N 5/332 |

* cited by examiner

VARIABLY CONTROLLED LIGHTING MECHANISM FOR FEEDERS

CROSS REFERENCE TO RELATED APPLICATION

The present application claims the benefit under 35 U.S.C. §119(e) to U.S. Provisional Application No. 61/842,282 entitled VARIABLY CONTROLLED LIGHTING MECHANISM FOR FEEDERS filed on Jul. 2, 2013, which is incorporated by reference in its entirety.

FIELD OF THE DISCLOSURE

The present disclosure generally relates to lighting control mechanisms for feeders, and more particularly to variably controlled lighting mechanisms for feeders.

BACKGROUND

When hunting animals, such as hogs or other varmints, in the nighttime hours, lighting may be used both for accuracy as well as for safety purposes. Lights having colors not easily detectable by these animals may be attached to a feeder, or an object in a typical feeding area, and they may attract the animals to the area around the feeder so that they may be hunted. However, existing light mechanisms suffer from various limitations, including limited user control as well as limiting lighting options. Existing light mechanisms also lack LED glare protection.

SUMMARY

Embodiments of the present disclosure may provide a variably controlled lighting mechanism, sometimes referenced as a hog light, that may be attached to the underside of a feeder for use in non-daylight hours to provide selective illumination through more than one color of LED light. In embodiments of the present disclosure, a wireless remote may include a series of inputs that may control various aspects of the hog light, particularly to illuminate the different LED lights that are integrated within the hog light, as well as to control the motor and/or feeder. The hog light also may be manually operated to selectively illuminate the different LED lights without departing from the present disclosure. This light also allows optimal vision of animals under the light having a built-in glare protection feature and/or an engineered additional glare protection/directional attachment. The LED lights may be inset so that light is dispersed and focused towards the ground at approximately 110 degrees.

Other embodiments of the present disclosure may provide a hog light attached to the underside of a feeder, the hog light comprising a plurality of different light emitting devices (LEDs) inset within the hog light, wherein the light from the plurality of different LEDs may be dispersed and focused toward the ground at an angle of approximately 110 degrees to provide selective illumination of animals approaching the feeder. The hog light may further comprise at least one input to manually operate the hog light to selectively illuminate the plurality of different LEDs. The hog light also may comprise a wireless remote including a series of inputs that control illumination of the plurality of different LEDs. The series of inputs may be selected from the group comprising: turning a motor on and off, turning the feeder on and off, selectively illuminating and extinguishing a single color of LED light, and selectively illuminating and extinguishing more than one color of LED light. Each of the series of inputs may be selected from the group comprising: multi-function, three-channel function, and single function. The wireless remote may further comprise a built-in LED flashlight. The plurality of different LEDs may provide more than one color of LED light. The more than one color of LED light may be green and red. The light from the plurality of LEDs may be green. The hog light may respond to more than one operational mode. The more than one operational mode may be a specified run time and a continuous run time. The hog light also may comprise a "slow on" mechanism to selectively brighten the plurality of LEDs over a specified period of time. The hog may further comprise a timer that automatically turns the plurality of LEDs on and off after a specified period of time. The hog light also may comprise a camera attachment incorporated into the hog light.

Embodiments of the present disclosure also may provide a variably controlled lighting mechanism attached to a control unit on the underside of a feeder, the mechanism comprising a wireless remote having a series of inputs that illuminate a plurality of light emitting devices (LEDs) integrated within the variably controlled lighting mechanism; and a timer that automatically turns the plurality of LEDs on and off after a specified period of time. The control unit may have a punch out to receive the variably controlled lighting mechanism. The plurality of LEDs may be inset so that light may be dispersed and focused towards the ground at approximately 110 degrees. More than one color of light may be provided through the plurality of LEDs. The series of inputs may be selected from the group comprising: turning a motor on and off, turning the feeder on and off, selectively illuminating and extinguishing a single color of LED light, and selectively illuminating and extinguishing more than one color of LED light. The lighting mechanism also may include a camera attachment.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a variably controlled lighting mechanism for feeder. The lighting mechanism, sometimes referenced as a hog light, may be used in non-daylight hours to provide selective illumination through more than one color of LED light. The hog light may be attached to the underside of a feeder. A wireless remote may include a series of inputs that may control various aspects of the hog light, particularly to illuminate different LED lights that are integrated within the hog light, but also to control the motor and/or feeder. In other embodiments of the present disclosure, the hog light may be manually operated to selectively illuminate the different LED lights. Regardless whether the hog light is remotely or manually operated, it should be appreciated that there may be embodiments of the present disclosure wherein the LED lights may be provided with a "slow on" feature so the LED lights may not illuminate immediately after being turned on; rather, the LED lights may take approximately 5-10 seconds to brighten to full power so that the light may not immediately spook animals that may be in the vicinity of the feeder.

Figure 1A:
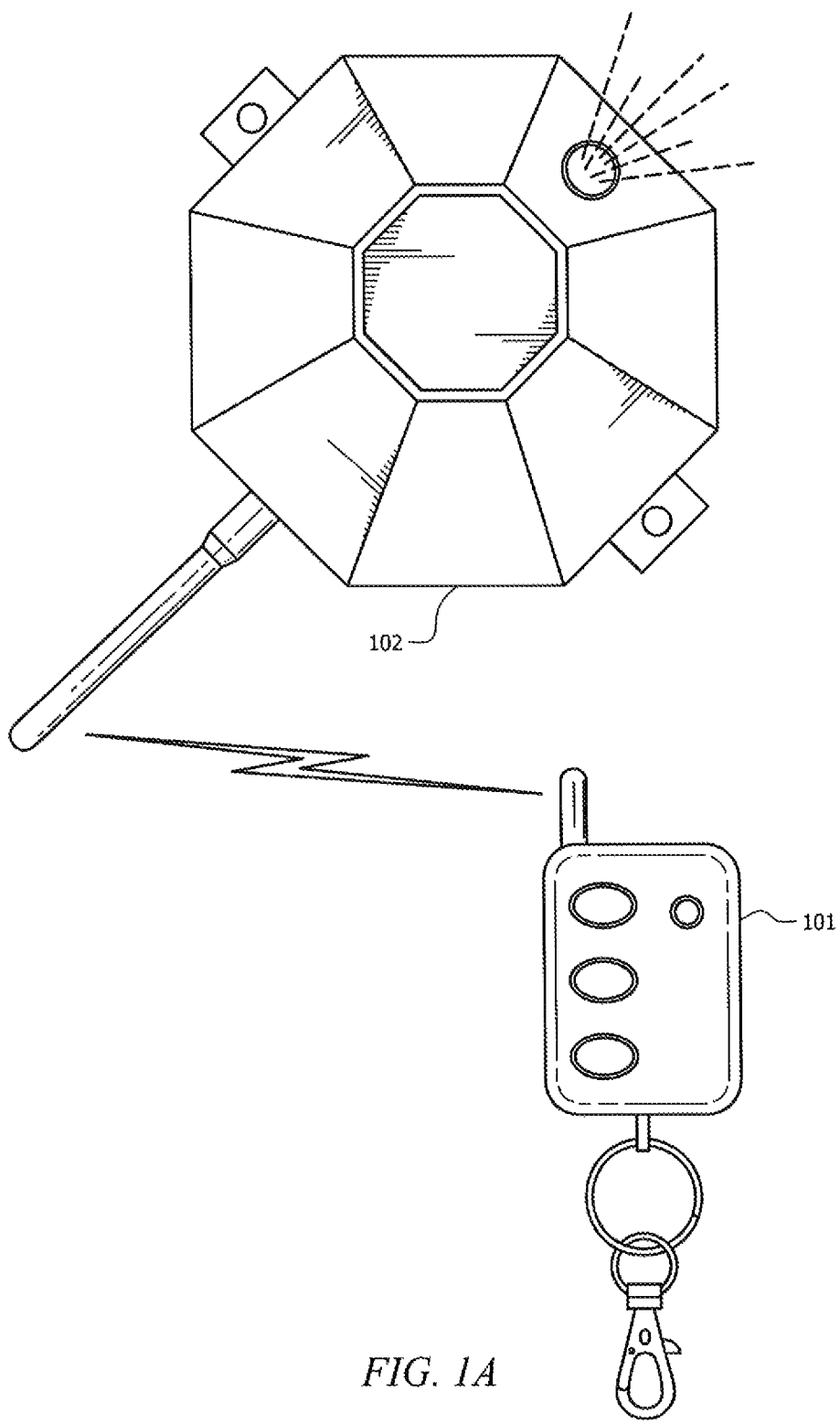
FIG. 1A depicts a remote and hog light combination according to an embodiment of the present disclosure.
Figure 2:
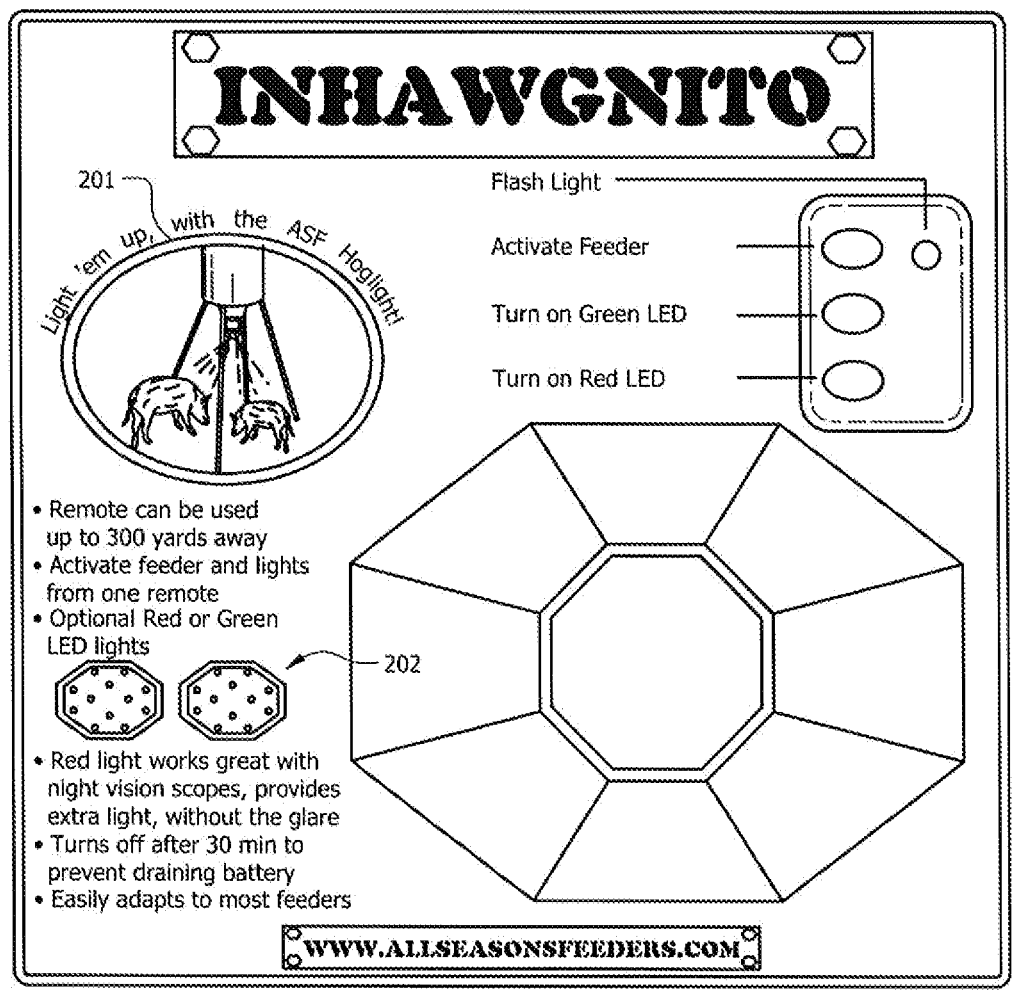
FIG. 2 depicts lighting provided by a hog light when affixed to a feeder according to an embodiment of the present disclosure.

FIG. 1A depicts wireless remote 101 that may control hog light 102 that may be activated to illuminate different colors of LED lights according to an embodiment of the present disclosure. In embodiments of the present disclosure, hog light 102 may be equipped to selectively illuminate a red LED light and/or a green LED light (such as lights 202 as depicted in operation in item 201 of FIG. 2). While hog lights may typically provide a green light, being able to provide a red light may be helpful to users wearing night vision goggles as a red light may provide extra light to users without the glare that may accompany use of a green light.

Figure 1B:
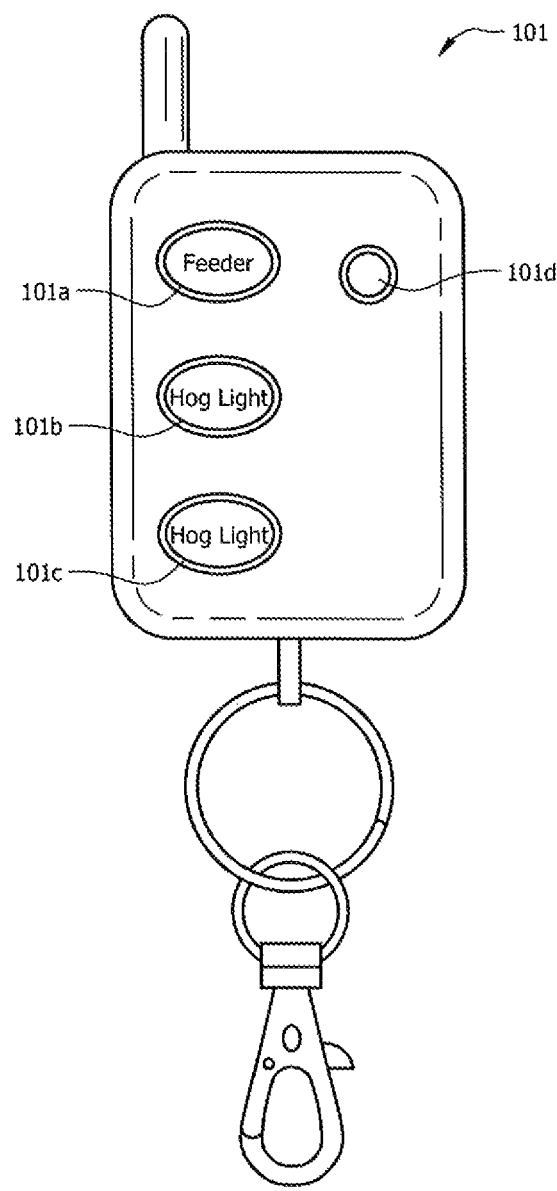
FIG. 1B depicts the remote of FIG. 1A according to an embodiment of the present disclosure.

FIG. 1B depicts the various inputs that may be provided on wireless remote 101 according to an embodiment of the present disclosure. The series of inputs present on wireless remote 101 may be used to control various aspects of a hog light that may be positioned relative to a feeder.

Input 101a may be provided to turn the motor and/or feeder on and off. As such, in addition to controlling hog light 102, remote 101 also may control the feeder to which hog light 102 may be affixed. While input 101a is depicted as controlling both the motor and the feeder, it should be appreciated that separate inputs may be provided on remote 101 to separately control the motor and the feeder without departing from the present disclosure.

Several inputs, including input 102b and input 102c, may be included as part of remote 101 so that a user may selectively illuminate a red and/or green LED light according to embodiments of the present disclosure. Input 101b may be provided to selectively illuminate and extinguish a green LED light that may form part of hog light 102. Input 101c may be provided to selectively illuminate and extinguish a red LED light that may form part of hog light 102. It should be appreciated that inputs 102b and 102c may include colors and/or words to indicate what type of LED light may be activated through selection of a given input. For example, an input may be labeled as "red" so that a user may press that input to activate the red LED light. In another example, the input may not include a specific labeling but may be colored red so that the user may select that input to activate the red LED light. Similarly, the input that may illuminate the green LED light may include a green color and/or be labeled in a manner to make it easy for the user to know which LED light may be activated through its selection.

In embodiments of the present disclosure, if an LED light is illuminated through selection of input 102b and/or input 102c on remote 101, the same input that was selected may be pressed and released to cause the LED light associated with that input to turn off. Further, if one LED light is illuminated (i.e., the red LED light is illuminated) and the user wishes to illuminate a different LED light (i.e., the green LED light), the user may press and release the input associated with the different colored LED light. Selecting this new input may then cause the first LED light to turn off and the second LED light will illuminate without the need to select the input associated with the first LED light to turn it off.

It should be appreciated that a hog light (such as hog light 102 depicted in FIG. 1) may be configured to respond to more than one remote operational mode from a remote (such as remote 101) according to embodiments of the present disclosure. In an embodiment of the present disclosure, the hog light may include a first remote operational mode that provides for an 8-second run time and a second remote operational mode that provides for a continuous run time. If the first remote operational mode is used, feeder input 101a may be selected and then released; however, if the second remote operational mode is used, feeder input 101a may be pressed and held for a specified period of time (i.e., for 5 seconds) before being released. In the second remote operational mode, the feeder will then remain in operation until the user presses and quickly releases feeder input 101a again, this time without depressing feeder input 101a. While two remote operational modes have been described, it should be appreciated that additional or alternative remote operational modes may be provided without departing from the present disclosure. For example, instead of an 8-second run time for the first remote operational mode, a shorter or longer run time may be provided. In another example, a third or fourth remote operational mode may be provided each having a run time that is longer or shorter than that provided for in the first remote operational mode.

Remote 101 also may optionally include built-in LED flashlight 101d that may assist a user in finding items while in a dark place, such as while hunting in the nighttime hours, according to embodiments of the present disclosure.

While embodiments of the present disclosure have been described to control a hog light using a wireless remote, such as remote 101, it should be appreciated that there may be embodiments where a user may elect or may need to operate the hog light manually. As such, hog light 102 may includes one or more inputs that may selectively illuminate the one or more LED lights forming hog light 102 according to embodiments of the present disclosure.

A hog light may include one or more inputs on the hog light that may allow a user to control the hog light without use of a remote. For example, there may be one or more inputs that may selectively activate the red and/or green LED lights. Having such an input may provide a manual override for illuminating and turning off the LED lights as well as for selectively changing the color of LED light that may be illuminated at a given time. In an embodiment where there is a single input on the hog light, if the single input is selected once, a first colored LED light may illuminate. If the input is selected a second time, a second colored LED light may illuminate. If the input is then selected a third time, the LED light that is illuminated at the time of selection may turn off. It should be appreciated that the sequence may be changed without departing from the present disclosure. For example, selecting the input once may illuminate the green LED light instead of the red LED light or vice versa without departing from the present disclosure. It also should be appreciated that if additional colors of LED lights were desired, the sequencing may be altered to provide for more selections to be made before the LED lights turn off completely according to embodiments of the present disclosure.

Regardless whether the hog light is operated through a wireless remote or manually, the LED lights associated with the hog light may be configured with a timer such that it may automatically turn off after a specified amount of time has elapsed. For example, the LED lights may be set to turn off after 15-60 minutes of illumination according to an embodiment of the present disclosure. In another embodiment of the present disclosure, the LED lights may turn off if there has not been any activity (i.e., no input has been selected) over a specified period of time. This timeout function may help to protect the battery from prematurely draining if the hog light were unintentionally left on for a long period of time.

Further, it should be appreciated that each of the inputs described may be multi-function, three-channel function, and/or single function without departing from the present disclosure.

Figure 3:
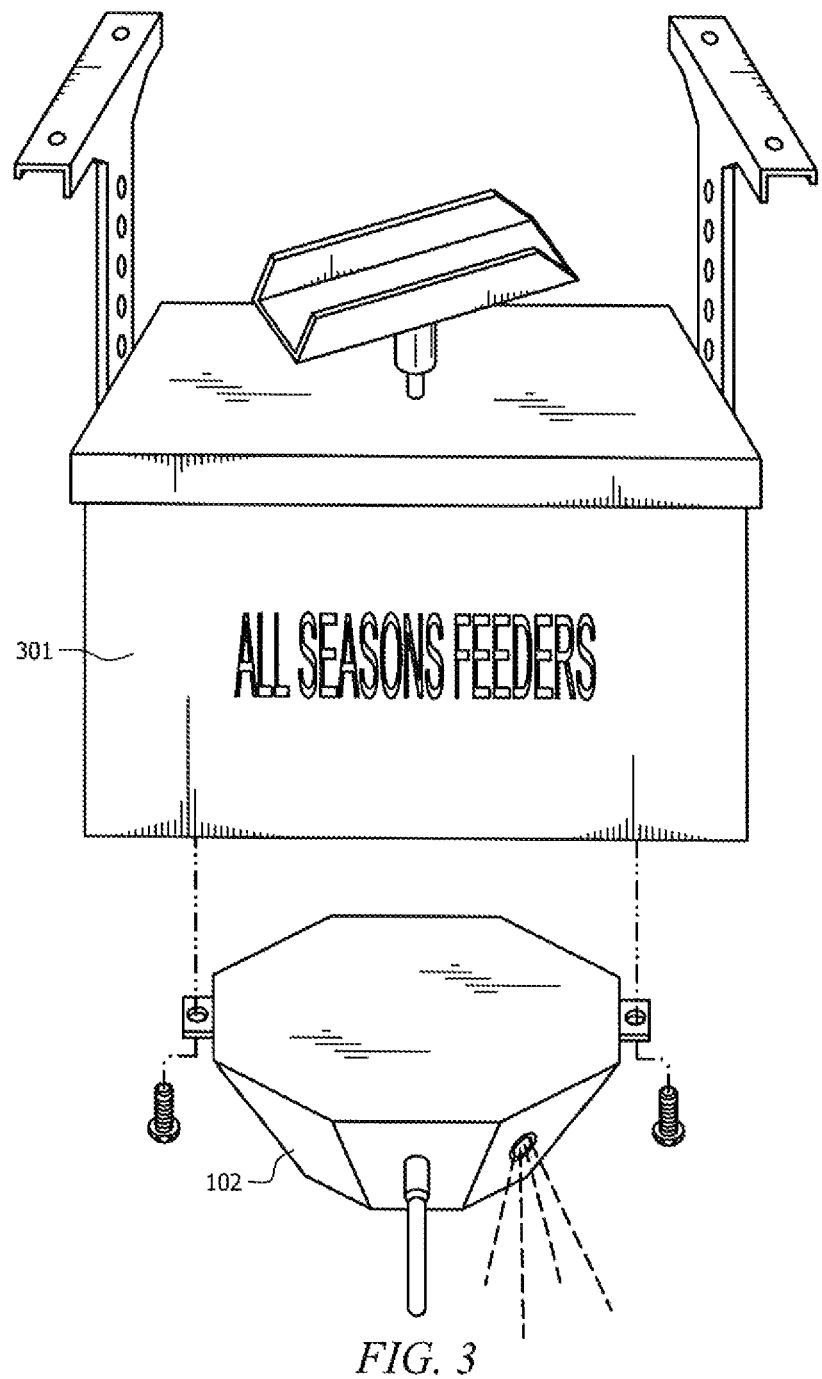
FIG. 3 depicts a hog light positioned relative to a control unit of a feeder according to an embodiment of the present disclosure.

FIG. 3 depicts hog light 102 positioned relative to control unit 301 of a feeder according to an embodiment of the present disclosure. In order to position hog light 102 with respect to the feeder, a hole may be drilled in the bottom of control unit 301. It should be appreciated that control unit 301 may be a 6V or a 12V control unit according to embodiments of the present disclosure. In some embodiments of the present disclosure, a punch out may already be provided in the bottom of control unit 301, and in such instances, no hole will need to be drilled. If a hole is to be drilled, the hole should be approximately ⅝ inch generally centered in the middle of the bottom of control unit. 301. Wires may then be run from hog light 102 up through the hole that has been made in control unit 301. Once the wires have been run through the hole, hog light 102 should be pushed flush up to the bottom of control unit 301. Once hog light 102 is flush with the bottom of control unit 301, a c-clip may be pushed into a notch present that is closest to the bottom of control unit 301. This clip may be used to help hold hog light 102 in place so it should be secure and tightly positioned.

It should be appreciated that the wires that may be run through the hole of control unit 301 may be labeled according to embodiments of the present disclosure. The timer may then be connected to the wires that may be labeled "timer." Similarly, the motor plug may be connected to the wires that may be labeled "motor." A wire may then be connected to the power cable, and the positive and negative wires may be connected to the battery. Piggyback spade connectors also may be provided so that multiple connections may be installed to the battery according to embodiments of the present disclosure. A fused power cord may accompany hog light 102 according to embodiments of the present disclosure. In some embodiments of the present disclosure, a camera attachment also may be incorporated into the hog light.

When installed, hog light 102 may be flush against control unit 301 such that hog light 102 may be recessed within the housing of the feeder to avoid a person using a scope from being blinded by the light when he/she is looking at animals roaming under the feeder where hog light 102 is affixed. It should be appreciated that a hog light according to embodiments of the present disclosure may be affixed to a variety of different feeders.

The light according to embodiments of the present disclosure may provide for optimal vision of animals under the light with its glare protection feature. The LED lights may be inset so that light is dispersed and focused towards the ground at approximately 110 degrees. This may prevent light glare that may affect direct vision or vision through any optics, thereby allowing someone to see animals more easily.

Embodiments of the present disclosure may provide more than one color of LED light within a single hog light. Further, the hog light that may illuminate using more than one color of LED light may be controlled through a wireless remote. Such a wireless remote may control the hog light as well as the feeder through a single remote. Accordingly, from a distance, a wireless remote may turn on/off a red LED light and/or a green LED light and/or set the feeder to run for any specified amount of time. It should be appreciated that a wireless remote according to embodiments of the present disclosure may be operable to control the feeder and/or hog light from approximately 300 yards away.

While the light may be referred to as a hog light according to embodiments of the present disclosure, it should be appreciated that the light may be used to attract or view animals other than hogs, such as varmints, without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A hog light attached to the underside of a feeder, the hog light comprising:
   a plurality of different light emitting devices (LEDs) inset within the hog light, wherein the light from the plurality of different LEDs is dispersed and focused toward the ground at an angle of approximately 110 degrees to provide selective illumination of animals approaching the feeder; and
   a wireless remote including a series of inputs that control illumination of the plurality of different LEDs.

2. The hog light of claim 1 further comprising:
   at least one input to manually operate the hog light to selectively illuminate the plurality of different LEDs.

3. The hog light of claim 1 further comprising:
   a "slow on" mechanism to selectively brighten the plurality of different LEDs over a specified period of time.

4. The hog light of claim 1 wherein the series of inputs are selected from the group comprising:
   turning a motor on and off, turning the feeder on and off, selectively illuminating and extinguishing a single color of LED light, and selectively illuminating and extinguishing more than one color of LED light.

5. The hog light of claim 1 wherein each of the series of inputs are selected from the group comprising:
   multi-function, three-channel function, and single function.

6. The hog light of claim 1, the wireless remote further comprising:
   a built-in LED flashlight.

7. The hog light of claim 1 wherein the plurality of different LEDs provide more than one color of LED light.

8. The hog light of claim 7 wherein the more than one color of LED light is green and red.

9. The hog light of claim 1 wherein the light from the plurality of LEDs is green.

10. The hog light of claim 1 wherein the hog light responds to more than one operational mode.

11. The hog light of claim 10 wherein the more than one operational mode is a specified run time and a continuous run time.

12. A variably controlled lighting mechanism attached to a control unit on the underside of a feeder, the mechanism comprising:

a wireless remote having a series of inputs that illuminate a plurality of light emitting devices (LEDs) integrated within the variably controlled lighting mechanism, wherein the variably controlled lighting mechanism is flush against the control unit to avoid a person from being blinded by the plurality of LEDs when looking at animals roaming below the underside of the feeder where the variably controlled lighting mechanism is placed.

13. The lighting mechanism of claim 12, wherein the plurality of LEDs are inset so that light is dispersed and focused towards the ground at approximately 110 degrees.

14. The lighting mechanism of claim 12 wherein more than one color of light is provided through the plurality of LEDs.

15. The lighting mechanism of claim 12 wherein the series of inputs are selected from the group comprising:

turning a motor on and off, turning the feeder on and off, selectively illuminating and extinguishing a single color of LED light, and selectively illuminating and extinguishing more than one color of LED light.

16. The lighting mechanism of claim 12 wherein the control unit has a punch out to receive the variably controlled lighting mechanism.

* * * * *